(12) United States Patent
Dwersteg

(10) Patent No.: US 10,075,113 B2
(45) Date of Patent: Sep. 11, 2018

(54) METHOD AND CIRCUIT ARRANGEMENT FOR CONTROLLING A STEPPER MOTOR

(71) Applicant: TRINAMIC MOTION CONTROL GMBH & CO. KG, Hamburg (DE)

(72) Inventor: Bernhard Dwersteg, Rellingen (DE)

(73) Assignee: TRINAMIC MOTION CONTROL GMBH & CO. KG, Hamburg (DE)

(*) Notice: Subject to any disclaimer, the term of this patent is extended or adjusted under 35 U.S.C. 154(b) by 14 days.

(21) Appl. No.: 15/314,032

(22) PCT Filed: Jun. 11, 2015

(86) PCT No.: PCT/DE2015/100236
§ 371 (c)(1),
(2) Date: Nov. 25, 2016

(87) PCT Pub. No.: WO2015/192831
PCT Pub. Date: Dec. 23, 2015

(65) Prior Publication Data
US 2017/0194886 A1    Jul. 6, 2017

(30) Foreign Application Priority Data

Jun. 18, 2014  (DE) .......... 10 2014 108 637

(51) Int. Cl.
*H02P 21/04* (2006.01)
*H02P 8/18* (2006.01)
(Continued)

(52) U.S. Cl.
CPC ............ *H02P 8/18* (2013.01); *H02P 8/04* (2013.01); *H02P 8/12* (2013.01); *H02P 8/22* (2013.01); *H02P 8/34* (2013.01); *H02P 23/0004* (2013.01)

(58) Field of Classification Search
CPC ...... H02P 21/04; H02P 23/03; H02P 2203/03; H02P 21/0085; H02P 23/0086;
(Continued)

(56) References Cited

U.S. PATENT DOCUMENTS 4,477,756 A * 10/1984 Moriguchi ............... H02P 8/42
                                                        318/685
4,926,104 A *  5/1990 King ..................... H02M 7/53875
                                                        318/599
(Continued)

FOREIGN PATENT DOCUMENTS

DE  10 2011 000569 A1   5/2012
EP      2 375 558 A1   10/2011
EP      2 428 480 A2    3/2012

OTHER PUBLICATIONS

International Search Report (Oct. 12, 2015) for corresponding International App. PCT/DE2015/100230.

*Primary Examiner* — Bickey Dhakal
(74) *Attorney, Agent, or Firm* — WRB-IP LLP

(57) ABSTRACT

A method and a circuit arrangement is described by means of which a stepper motor can be operated by an adaptive control over a large rotational speed range, including a standstill, in which the motor is electrically fixed in a specific rotational position, and with high precision and running smoothness corresponding to a specified motor current course. This is achieved essentially by the fact that the motor is operated in a low rotational speed range including a standstill with a voltage-controlled or voltage-regulated first operating mode and in a higher or high rotational speed range with a current-controlled second operating mode.

17 Claims, 5 Drawing Sheets

(51) Int. Cl.
*H02P 8/12* (2006.01)
*H02P 8/22* (2006.01)
*H02P 8/04* (2006.01)
*H02P 8/34* (2006.01)
*H02P 23/00* (2016.01)

(58) Field of Classification Search
CPC .. H02P 25/066; H02P 8/22; H02P 8/02; H02P 27/085
See application file for complete search history.

(56) References Cited

U.S. PATENT DOCUMENTS

| | | | |
|---|---|---|---|
| 7,592,764 B2 * | 9/2009 | Vermeir | H02P 6/085 |
| | | | 318/372 |
| 2008/0309274 A1 * | 12/2008 | Thomson | H02P 8/12 |
| | | | 318/567 |
| 2013/0119914 A1 * | 5/2013 | Larsson | H02P 8/12 |
| | | | 318/496 |

* cited by examiner

METHOD AND CIRCUIT ARRANGEMENT FOR CONTROLLING A STEPPER MOTOR

BACKGROUND AND SUMMARY

The invention relates to a method and a circuit arrangement by means of which a stepper motor can be operated by an adaptive control across a broad rotational speed range including a standstill in which the motor is electrically fixed in a specific rotational position, and with high precision corresponding to a predefined motor current course.

It is generally known that in stepper motors a magnetic rotor is turned stepwise by each a small angle by means of a controlled rotating electromagnetic field which is generated with static motor coils.

Frequently, it is desired to rotate the motor with as far as possible small step angles, in order to achieve an as high as possible resolution and exactness of the positioning and a uniform course of the motor torque. For these reasons, instead of the known full-step and half-step operation, the so called micro-step operation is preferred in which the currents flowing through the motor coils are not only switched on and off, but increase and decrease in a certain manner. The resolution and the uniformity with which the stepper motor conducts the micro-steps is in this case substantially dependent on the number of different current amplitude values with which the motor coils can be operated and how exactly these can be kept. Usually, it is most appropriate to excite the motor coils with a sinusoidal- and cosine-wave, respectively, because with this a very continuous and jerk-free rotation of a microstep-optimized motor and by this a calm motor operation can be obtained.

For electrically controlling stepper motors, especially in the micro-step operation, known chopper methods are used, with which by means of a motor-supply voltage (direct voltage) for each instant of time by means of current pulses the current direction, current value and current course is impressed into each of the motor coils, which are given by a specified current (target coil current), in order to drive the motor by the thus induced rotating magnetic field.

In this case it is usual to measure the actual current flowing through the motor coils and to regulate it in dependence thereon in positive and negative direction and polarity, respectively, by means of appropriately activated and temporally dimensioned chopper phases (ON, SD, FD) of a chopper method such that the motor current at least substantially coincides in each chopper phase and by this over the entire course with the course and the polarity of the related target coil current. This operation shall be denoted in the following as a current-regulated operating mode.

In such a chopper method, usually three different chopper phases (coil current phases) are distinguished, namely ON-, FD- and SD-phases.

During the ON-phase (also called positive switch-on phase) the coil current in a coil is actively driven into the coil in the direction of the instantaneously specified polarity and direction, respectively, of the coil current, so that the amount of the coil current increases relatively quick and continuously (switch-on period) until it has reached its instantaneous target value and the ON-phase is then terminated. The direction of the coil current which is impressed by such an ON-phase is thus equal to the instantaneous polarity and direction, respectively, of the coil current.

The polarity of the coil current is in case of a sine-shaped coil current for example positive in the first and second quadrant and negative in the third and fourth quadrant.

During the FD-phase (negative switch-on phase) the coil current is actively reduced against the just specified polarity of the coil current by reversing the poles of the coil and feeding back the coil current into the current supply until it has reached its instantaneous target value and the FD-phase is then terminated. Alternatively, the FD-phase can also be terminated without regulation after the expiration of a pre-set time duration such that due to experience in a certain application during the related FD-phase the maximum necessary decrease of the coil current is reached without actually measuring the same. In any case, the FD-phase is provided to reduce the coil current particularly during the time of decreasing amounts of the coil current (i.e. during the second and third quadrant of a sine-shaped coil current) relatively quickly.

The third chopper phase is the recirculation phase or SD-phase, in which the related coil is not actively controlled but rather short-circuited or bridged, so that the coil current, due to the inner resistance of the coil and the counter-EMF, decreases only gradually (i.e. slower than during the FD-phase). During this phase the coil current can usually not be measured, so that the SD-phase has to be terminated after the expiration of a pre-set time duration, wherein usually for all SD-phases the same constant time duration is pre-set.

These three chopper phases are therefore temporally activated, combined and dimensioned by means of chopper switch signals, generated by a chopper and supplied to a motor coil driver circuit, such that the actual coil current follows over its entire (e.g. sine-shaped) course, namely during the increasing and decreasing sections of the coil current, as far as possible promptly and exactly the corresponding specified current (target coil current) for the related motor coil and is at least substantially not influenced by the voltage which is counter-induced by the rotor within the motor coils (counter EMF) or other effects. In other words, each period of the actual coil current is composed of a plurality of chopper phases, by means of which each target coil current value of the current period at each instant of time of the activation of the related chopper phase is impressed into the coil.

However, it has revealed that during this current-regulated operating mode particularly in case of a low rotational speed and standstill of the motor at an electrically fixed position (i.e. in a certain position of rotation) short-time current variations due to fluctuations of the regulation may occur in the audible frequency range which is undesired. Such fluctuations of the regulation result from measuring or sampling noises, couplings within the motor and from interferences from other circuits or from the supply voltage.

Furthermore, it can be difficult at low motor currents in connection with the resulting only very short duration of the ON- and (if any) FD-phases and due to transient effects and blank times, to reliably measure during these short times the actually flowing coil current and to compare it with the instantaneous target coil current value. The phases are therefore usually extended to a certain minimum value.

It is desirable to provide a method and a circuit assembly for operating a stepper motor, with which with a relatively small circuit complexity an optimized (and particularly calm) operation of a stepper motor, particularly with respect to a desired or target coil current course, can be obtained over a broad rotational speed range, i.e. between a standstill of the motor in which the motor is electrically fixed in a specific rotational position and a motor-related highest rotational speed.

An aspect of the invention is preferably applied in micro-step operation, however, it can be applied in full-step and half-step operation as well.

The dependent claims disclose advantageous embodiments of the invention.

BRIEF DESCRIPTION OF THE DRAWINGS

Further details, features and advantages of the invention are disclosed in the following description of preferred embodiments on the basis of the drawing. It shows.

DETAILED DESCRIPTION

First, the implementation of the above three chopper phases during the current-regulated operating mode will be explained.

Figure 1:
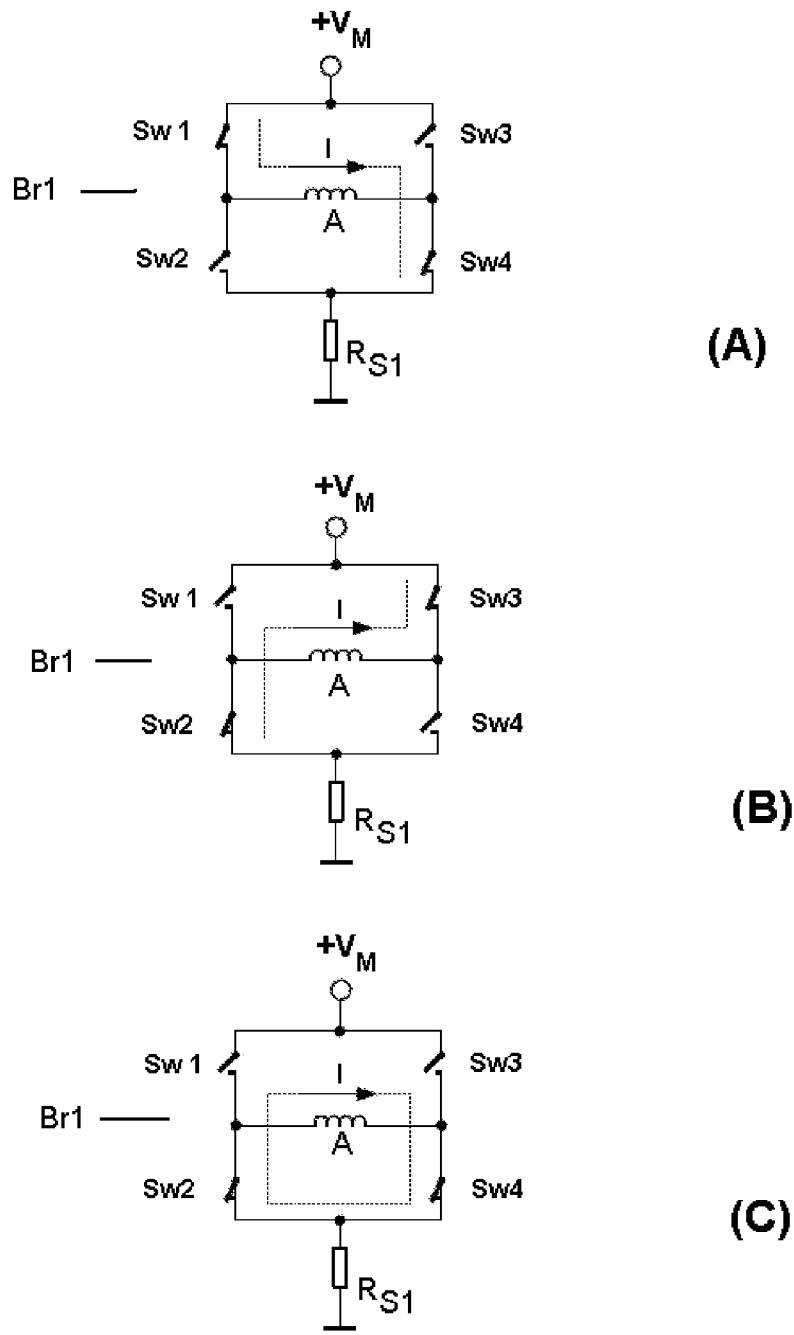
FIG. 1 circuit diagrams of the three chopper phases of a motor coil during a chopper operating mode.

The three chopper phases are schematically shown in FIG. 1(A), FIG. 1(B) and FIG. 1(C), respectively. Each of these three figures shows a bridge circuit Br1 comprising a first to fourth switch Sw1, Sw2, Sw3, Sw4, wherein a first and a second switch Sw1, Sw2 as well as a third and a fourth switch Sw3, Sw4 are switched in series, and the two series connections are connected in parallel with each other. The motor coil A is connected with the center points of the bridge branches. The foot of the bridge circuit is connected via a measuring resistor $R_{S1}$ to ground for measuring the actual current flowing in the motor coil, while the head of the bridge circuit is attached to a motor supply voltage $V_M$. The switches Sw1, Sw2, Sw3, Sw4 are operated by means of a driver circuit to which the chopper switch signals are supplied for activating the chopper phases.

FIG. 1(A) shows the switch positions and the resulting direction of the current flow I from the supply voltage $V_M$ through the coil A to ground during the above mentioned first or ON-phase during which this direction is each the same as the instantaneous given direction and polarity, respectively, of the coil current, wherein the first and the fourth switches Sw1, Sw4 are closed and the second and the third switches Sw2, Sw3 are open.

FIG. 1(B) shows the switch positions and the polarity reversal resulting therefrom of coil A as well as the feedback of coil current I into the supply voltage $V_M$, i.e. against the instantaneous given direction and polarity, respectively, of the coil current (which is the same as in FIG. 1(A)) during the above mentioned second or FD-phase in which the first and the fourth switches Sw1, Sw4 are open and the second and the third switches Sw2, Sw3 are closed.

Finally, FIG. 1(C) shows the third or SD-phase in which the coil A is short-circuited or bridged, i.e. the second and the fourth switches Sw2, Sw4 are closed while the first and the third switches Sw1, Sw3 are open (or the reverse, correspondingly), so that the current I flowing in the coil A gradually drops off, i.e. recirculates, in accordance with the internal resistance of the coil A.

For the sake of simplicity, a micro-step operation with a substantially sinusoidal current drive of the coils is assumed for the following considerations, i.e. in the case of a 2-phase stepper motor, one of the two coils is subjected to a sinusoidal current course and the other coil is supplied with a current course which is phase-shifted by 90° and thus cosinusoidal. However, the following considerations apply accordingly in the case of non-sinusoidal current drive and/or stepper motors with a different number of phases and the associated other phase shift of the driving coil currents relative to one another, as well as in a full- and a half-step operation.

Since, in this current-regulated operating mode, the actual current through the coils is actively regulated in each ON and possibly FD phase, this mode can very quickly react to changes or deviations of the actual coil current. Thus, e.g. it is also possible to actively dampen resonance situations by appropriately reducing the excess coil current. However, since this operating mode can have the above-described disadvantages at low rotational speeds and when the motor is at a standstill, it is activated according to the invention only at and above a predetermined minimum rotational speed of the motor. Below this rotational speed, the motor is controlled according to the invention with a voltage-based (i.e. voltage-controlled or voltage-regulated) operating mode in which the required coil current is not impressed by the activation and duration of the chopper phases (i.e. current flow phases) but is generated by means of a voltage which is applied to the motor coils and which is adjusted by changing its amount (or its amplitude) and its direction (or polarity).

In this case, the amount of this voltage has to be controlled or regulated, taking into account, in particular, the internal resistance of the motor coils and the counter-EMF increasing with increasing rotational speed, in such a way that by this the instantaneous target coil current flows through the motor coils. This voltage may e.g. be a PWM voltage generated from the motor supply voltage.

In particular, the motor supply voltage can be pulse-width-modulated and applied with corresponding polarity to the motor coils, the duty factor of this modulation being controlled or regulated in such a way that the resulting effective voltage across the motor coils each has an amount which causes the instantaneous target coil current value to flow.

The control of the pulse width modulation (PWM) may be conducted e.g. on the basis of specified values and a parameterization or a stored allocation between a number of specified motor rotational speed ranges and the respectively required pulse duty factor of the PWM voltage. However, influences such as e.g. a heating of the motor coils and an increase in the internal resistance of the coils caused thereby, or load-induced load angle changes, which in turn influence the phase of the counter-EMF and thus the effective coil current, can not be considered.

Therefore, it is preferred to measure the actual coil current and to regulate the duty factor of the PWM voltage applied to the coil via a current control loop accordingly.

The actual coil current can be detected, for example, by means of an analog-to-digital converter in order to control the amplitude or the amount of the voltage applied to the coil, or the duty factor of the PWM voltage, e.g. via a regulator, preferably a PI-regulator. This results in a relatively slow control of the effective coil voltage and thus of the coil current, compared to the above-described current-based operating mode, so that the voltage-regulated operating mode can not react as quickly to current deviations as the current-regulated operating mode (in which the coil current is readjusted in each ON and possibly FD chopper phase). Thus, in the voltage-regulated operating mode, on the one hand, e.g. short-time current deviations are not corrected, but on the other hand there is also no current ripple in the high frequency range due to measurement inaccuracies at low coil currents. Furthermore, short-term current changes due to regulation fluctuations can not occur, which can lead to disturbing noises in the audible frequency range.

Furthermore, with the voltage-regulated operating mode, the effective coil current in both coils can be tracked in parallel in either coil, either on the basis of a measurement of the instantaneous actual coil current in each only one coil, or on the basis of the measurement of the instantaneous actual coil current in both coils.

A regulation of the duty factor of the PWM voltage is also advantageous with regard to the combination of the voltage-regulated operating mode with the current-regulated operating mode and a common and simple use of the circuit components required in each case, as well as with regard to ensuring a jump-free transition of the coil current when switching between both operating modes.

In the following, an embodiment of a method according to the invention is described by means of which a stepper motor is at a standstill and at a low rotational speed which is below a predetermined switching rotational speed, operated with a voltage-regulated operating mode, and is at a higher and high rotational speed which is at and above the switching rotational speed, operated with a current-regulated operating mode.

In implementing the principle according to the invention and for determining the switching rotational speed, the following considerations must be taken into account:

As mentioned above, in the current-regulated operating mode at low motor rotational speed and at standstill of the motor, noise can be generated which is in the audible frequency range. On the other hand, in the case of relatively low motor currents (which can occur in particular at low motor rotational speeds), it can be difficult due to the associated very short duration of the ON phases to measure the current which is actually flowing through the coils during these ON phases and to compare it with a target coil current value.

At the beginning of each (ON and possibly FD) chopper phase, a transient or response time must first be waited, within which, on the one hand, disturbances of the actual coil current due to the switching-on process are reduced and, on the other hand, the measuring voltage level at the respective measuring resistor $R_S$ in the foot point of the bridge is reached according to the actual coil current. Furthermore, the comparator, which serves to compare a measuring voltage level representing the instantaneous actual coil current value with a target voltage level which represents a specified target coil current value, also requires a specific time duration to produce its output signal. Thus, each ON (and possibly every FD) chopper phase must have a certain minimum duration (blank time) before the actual coil current can be detected and regulated to the target coil current value. This duration is usually in the range of one or a few microseconds, and is thus a few percent of the repetition frequency of the chopper phases when, as is generally the case, this frequency is in a frequency range slightly above the audible frequency range.

However, in case of the voltage-regulated operating mode, it must be taken into consideration that a higher rotational speed and/or a higher load angle of the motor results in a phase shift between the coil voltage and the coil current, so that a variation of the coil voltage affects only with a time delay the coil current so that an exact regulation of the actually measured coil current by changing the coil voltage is no longer readily possible.

A further problem with the voltage-regulated operating mode can result from the fact that stepper motors usually have a very low internal resistance, so that only a relatively low coil voltage and thus a low pulse duty factor of the PWM voltage applied to the coils is sufficient to achieve a certain target coil current. However, if the duty factor becomes too low, and thus the switch-on duration of the voltage (and thus also the duration of the current flow or chopper phases) falls short of a certain minimum duration, as already described above in connection with the current-regulated operating mode, the coil current (i.e. the resulting measuring voltage) can no longer be compared with the related target value by means of the comparator.

Figure 2:
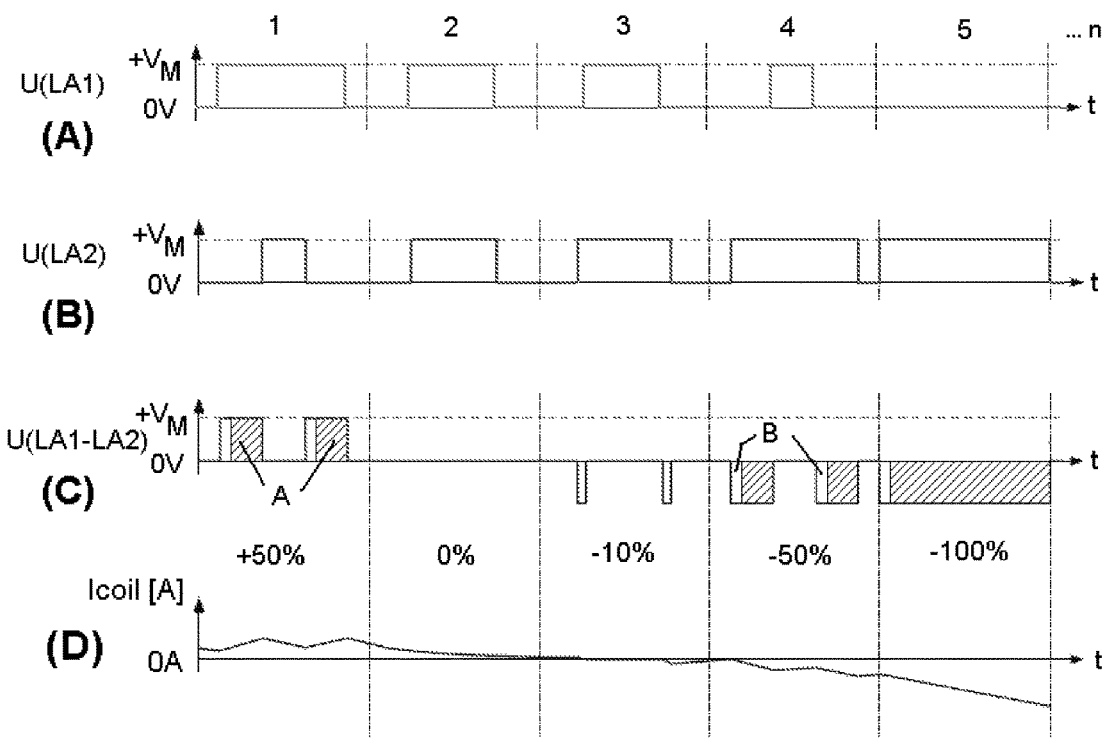
FIG. 2 time-dependency diagrams of PWM voltages applied to a motor coil, and resulting currents.

If for example an effective voltage is applied to a coil which is 10% of the supply voltage, and if the blank time is 1 µs at a period of the PWM voltage of 50 µs, no current measurement is possible in case of switch-on durations of less than 1 µs, i.e. less than 2% duty factor of the PWM voltage. Thus, with such a motor, coil current values of less than 20% of the maximum current can no longer be measured. This results in a considerable limitation of the detection of measured values. For purposes of clarity, reference is made to FIG. 2. In this Figure, for five chopper cycles 1, 2, 3, . . . 5, a first and a second PWM voltage U(LA1), U(LA2) is shown by which a supply voltage $+V_M$ is applied to at least one of the motor coils with respective opposing polarities, so that by changing the pulse widths of these two voltages relative to one another, an effective PWM voltage in the form of a differential voltage U(LA1–LA2) (FIG. 2(C)) with positive or negative polarity can be applied to the related motor coil, the effective duty factor of which is adjustable between −100% (negative polarity) and +100% (positive polarity). The resulting actual coil current course $I_{coil}$ is indicated by way of example in FIG. 2(D) and is thus generated by a plurality n of such chopper cycles 1, 2, . . . n.

The actual coil current $I_{coil}$ generated by the effective PWM voltage (i.e. the differential voltage U(LA1–LA2)) can only be measured in the time ranges of each chopper phase which are hatched in FIG. 2(C) and which are denoted with the letter A, while the blanking times in which for the above-mentioned reasons no measurement is possible are indicated by the letter B.

In order to solve the problem arising therefrom in particular with a low effective duty factor, two motor states are distinguished, namely, the standstill and rotation of the motor.

When the motor is at a standstill, the speed with which the coil currents have to be regulated is small or uncritical because the current-influencing variables, e.g. the supply voltage and the motor temperature, or also the specified values of the target coil current, do not change or change only slowly. Since the motor stands at a fixed electrical and thus mechanical position, the current in both motor coils is constant. If the motor is operated in micro-step mode, so that the two motor coils are driven with sinusoidal or cosineshaped current courses, and if the current value in a first coil is at or near the peak value of the sine wave, the current value in the other second coil is at or near zero. Thus, the effective duty factor at this second coil is also at or near zero, so that only the current in the first coil (in which the higher current flows) can be measured due to the blank time described above. Thus, the current is preferably always measured in the coil which is energized as to the amount more intensively, and the effective duty factor of the differential voltage U(LA1−LA2) on this coil is correspondingly regulated, namely in each chopper cycle 1, 2, . . . n by setting the duty factor of the first and the second PWM voltage U(LA1), U(LA2) according to FIG. 2(A) and FIG. 2(B), respectively.

The chopper cycles in this case preferably all have the same time duration, wherein each chopper cycle, as shown in FIGS. 2(A) and 2(B), respectively contains each one pulse of the first and of the second PWM voltage U(LA1), U(LA2) which then form the differential voltage U(LA1−LA2) at the respective coil.

Thus, in the voltage-controlled operating mode, it is firstly determined in which motor coil the current of greater amount flows.

The above-mentioned effective duty factor of the differential voltage U(LA1−LA2) at this coil is then preferably controlled as follows:

In a first step, the actual instantaneous coil current value is measured (for example, by means of a measuring resistor) during a first chopper phase and compared with the instantaneous target coil current value.

If the amount of the measured coil current value is smaller than the instantaneous target coil current value, then in a second step the duty factor of one of the two PWM voltages U(LA1); U(LA2) in increased and/or the duty factor of the other PWM voltage U(LA2); U(LA1) is decreased, wherein the selection of the first and second PWM voltages (which are applied to the coil in opposite directions) whose duty factor is increased or decreased is selected such that, according to the specified instantaneous polarity of the target coil current value, the amount of the actual coil current value is increased.

If, however, the amount of the measured coil current value is larger than the instantaneous target coil current value, then the duty factor of at least one of the two PWM voltages is changed in the opposite direction in a third step, so that according to the specified instantaneous polarity of the target coil current value, the amount of the actual coil current value is decreased.

At the same time, in the next chopper phase, the actual instantaneous coil current value is again measured as in the above mentioned first step and the sequence is repeated because of the possibly changed pulse duty factor. In this way, the effective duty factor of the differential voltage (FIG. 2(C)) and thus also the actual coil current value oscillates around the respective instantaneous target coil current value.

The comparison of the actual instantaneous coil current value with the instantaneous target coil current value is preferably conducted by means of a comparator, wherein the instant time of the comparison preferably being placed as far as possible into the temporal center of each chopper phase. This takes account of the circumstance that the current in a coil increases from a starting value to a final value due to the coil inductance after each switching-on, and, during the pause between two chopper phases, again decreases substantially from the final value to the starting value due to the internal resistance of the coil and the related driver circuit.

The amount of the respective change in the duty factor of at least one of the two PWM voltages according to FIGS. 2(A) and 2(B) is preferably constant and equal and is predetermined in such a way that the amplitude with which the actual coil current value oscillates around the target coil current value is, on the one hand, not too great but on the other hand the actual coil current value can follow the target coil current value quickly enough. The determination of this amount can be conducted by tests according to the type of the motor and the conditions of use.

In a preferred refined regulation, use is made of the fact that the coil current $I_{coil}$, as exemplarily shown in FIG. 2(D) as a result of the effective PWM voltage U(LA1−LA2) shown in FIG. 2(C), increases (or decreases) in each chopper phase, starting from a starting value to a final value, wherein the amount of the instantaneous target coil current value being time-located mid-way between the starting value and the final value. Thus, if the comparator during a chopper phase indicates that the instantaneous actual coil current value has become equal to the instantaneous target coil current value, then from a comparison of the instant of time at which the respective signal is generated at the output of the comparator, with the instant of time of the center of the instantaneous target coil current value within the related chopper phase, a conclusion can be drawn as to the actual amount of the current deviation between the actual value and the target value of the coil current. This deviation can, in turn, be used as an input value, for example for a regulator, preferably a PI-regulator, in order to adjust its step width, with which the duty factor of the PWM voltage is varied as explained above, to the level of this current deviation.

The amplitude of the current in the coil in which the lower amount of current is flowing automatically adjusts itself to the correct value when the duty factors of the PWM voltages on both coils are proportionally adjusted because the internal resistance of the coils of a motor due to the symmetrical configuration of the motor can be assumed to be at least substantially identical. An oscillation of the actual current amplitudes due to the activity of the regulator around the amplitude of the target coil current is largely identical due to the time-offset regulation of the current in both coils and therefore does not produce a relevant error in the electrical angle between the two coils.

In the case of a rotation of the motor (at least above a predefined minimum rotational speed), the above-described algorithm for the motor standstill is preferably not further applied since the counter-EMF of the motor and the inductance of the coils principally result with increasing rotational speed in an increasing phase shift between the effective voltage applied to the coils and the resulting effective coil current. The angle of this phase shift is not known beforehand since it depends on both the speed of the motor and the motor characteristics as well as the load on the motor. If, however, this phase angle is not taken into account, there is a faulty lag-behind regulation of the coil current since the instantaneous coil current value can not correspond to the instantaneous target coil current value.

Figure 3:
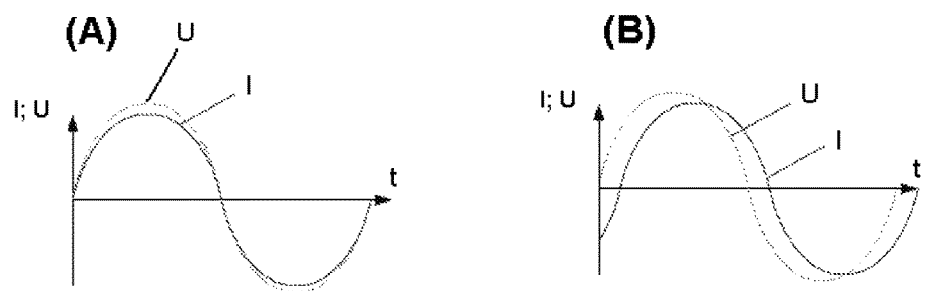
FIG. 3 time-dependency diagrams of the courses of (effective) voltages applied to a motor coil, and resulting currents.

This is schematically shown in FIGS. 3(A) and 3(B). FIG. 3(A) shows the course of an effective voltage U applied to a motor coil which was generated in the voltage-regulated operating mode as described above from a specified target coil current course (and being composed from the chopper cycles 1, 2, . . . n according to FIG. 2 and resulting from the effective PWM voltage according to FIG. 2(C)), as well as the actual coil current I generated therewith at a low rotational speed of the motor with negligible phase offset between current I and voltage U. In comparison to this, FIG.

3(B) shows the phase offset between current I and voltage U at a higher rotational speed of the motor at which the actual coil current I follows behind the applied coil voltage U.

It should also be noted that it is necessary to be able to regulate the actual coil current more quickly when the motor is turning than when the motor is at a standstill, since, for example, the acceleration of the motor to a higher speed should be possible within a few milliseconds, i.e. in case of a half- or full-step operation within a few fullstep cycles, or in micro-step operation within a few sinusoidal cycles.

These two problems in connection with the voltage-controlled operating mode are preferably solved in that, when the motor rotates in the first operating mode, the actual coil current is regulated by scaling the duty factor of the effective PWM voltage applied to the coils (FIG. 2(C)) by means of a regulator, preferably a PI-regulator, with which a relatively fast response time can be achieved with a relatively low deviation of regulation.

This is preferably realized as follows:

When starting the motor, i.e. with the beginning of a rotary movement, the last coil current value determined during the motor's standstill is first used for the motor. However, since, as mentioned above, the phase shift between the PWM voltage applied to the motor coil and the actual coil current is not negligible and also not known, it is not possible to determine at the instant of time the PWM voltage is applied if the actual coil current value measured at this instant of time coincides with the specified target coil current value.

Therefore, according to FIG. 4(A), at first a current threshold S in the form of a constant coil current value is calculated in such a way that, during a sinusoidal half-wave of the predetermined or specified target coil current course, the current threshold S is reached or exceeded only for a relatively short fixed time duration, for example between approximately 5% to 20% of the duration of the sinusoidal half-wave. Then, during each chopper phase, the actual coil current I is measured, compared with the current threshold S, and determined how long the time duration during the sinusoidal half-wave is during which the calculated current threshold S is actually reached and exceeded by the actual coil current I.

On the basis of the ratio between the fixed target value and the actual value of these time durations, the duty factor of the PWM voltage applied to the relevant coil is then increased by means of the regulator (preferably a PI-regulator) in the following sinusoidal half-wave of the target coil current when the actual value of the time duration was smaller than its target value, and the duty factor (and thus the effective voltage applied to the coil) is decreased when the actual time duration was greater than the fixed time duration. At the same time, in this sinusoidal half-wave, the actual value of the said time duration is again measured and compared with the target value, so that the duty factor of the PWM voltage applied in the next sinusoidal half-wave can again be adapted accordingly.

Since, in the case of a 2-phase motor two coils are present, four half-waves can thus be measured in each electrical period of the coil currents in this way so that in each full step a new measurement result becomes available and the coil current can be readjusted accordingly.

In this way, it is possible to react much faster to a deviation of the actual coil current value from a target coil current value than by a pure comparison as to whether the target coil current value has been achieved at all.

FIG. 4(A) shows this comparison on the basis of an assumed actual coil current curve I, which is generated by a (PWM) voltage U applied to the coil. The current threshold which has been calculated (preferably for each sinusoidal half-wave) so that it is reached and exceeded only during a relatively short time duration of a sinusoidal half-wave of the predetermined or specified target coil current course, is denoted by the letter S. Furthermore, the output signal K of a comparator is shown which always assumes a high level when the actual coil current value I reaches and exceeds the current threshold S.

When fixing the current threshold S, the following must also be considered: as already explained above with reference to FIG. 2(C), an actual coil current can no longer be measured if the duty factor of the effective PWM voltage applied to the coil is too small and the resulting effective voltage becomes too low. The time range within which the actual coil current can be measured (hatched area A in FIG. 2(C)) is again indicated exemplarily by hatching in FIG. 4(B).

Since, for measuring the actual coil current, a certain minimum height of the effective voltage (or its duty factor) applied to the coil in question is required, a large phase shift of the actual coil current may lead to the actual time duration of the current threshold S being exceeded during a sine half-wave is greater than the measured time duration of this overshoot. In the illustration of FIG. 4(B), the actual coil current value I can only be compared with the current threshold S (as in FIG. 4(A)) within the hatched area. Conversely, the time duration of the actual measured overshoot of the current threshold S decreases with increasing phase shift (i.e. In particular at high rotational speed). As a result, the PI-regulator would thus increase the actual coil current value more strongly than corresponds to the target coil current course.

Therefore, if this error exceeds a predetermined value, it should be switched from the voltage-regulated operating mode to the current-regulated operating mode. Usually, the switching speed or switching rotational speed of the motor is set at some tens or a few hundred Hz of the frequency of the coil current. Within this range, the phase shift is usually moderate so that the measurement can be performed correctly.

Preferably, during this switching from the first to the second operating mode, the fact should be considered that the phase shift of the actual coil current I, which is produced in the voltage-controlled operating mode, would lead to a jump in the movement of the motor during the switching-over, since in the current-regulated operating mode, the target coil current is regulated by switching the actual coil current and thus a phase shift between the coil voltage and the coil current has no role or need not be taken into account.

For this purpose, the phase shift is determined before the instant of time of switching to the current-regulated operating mode (i.e. the second operating mode).

This is, for example, possible if in particular by means of the output signal of the comparator in the voltage-regulated operating mode, the point in time is determined which is in the center between the beginning and the end of the current threshold S being exceeded by the actual coil current course I during a sinusoidal half-wave. At this instant of time, the actual coil current reaches its peak value. Preferably, such a point in time can also be calculated by averaging several points in time of this type determined during several sinusoidal half-waves. If such a point in time is then compared with the point in time of the occurrence of the peak value of the specified target coil current and thus of the peak value of the effective voltage applied to the coil concerned, the time delay and thus the phase shifting of the actual coil current is obtained from the distance between these instants of time.

This type of determination of the phase shift is preferred, in particular in respect of circuitry, if the current threshold S is required and determined in any case for the purpose of the above-described regulation of the duty factor of the PWM voltage during the first operating mode during the rotation of the motor. On the other hand, however, it is also possible to regulate the height of the voltage applied to the coils in the first operating mode (or the duty factor in the case of a PWM voltage) on the basis of a mere comparison of the actual and target coil current values in each chopper phase (as described above in the case of standstill of the motor) also during the rotation of the motor. In this case, the current threshold S as described above is preferably used only for determining the phase shift.

If a correspondingly low motor speed has been selected or predetermined for the switch-over from the first operating mode to the second operating mode, this phase shift may also be so small that it is negligible and/or need not to be taken into account in a given application of the motor, so that the phase shift is determined, but the target coil current is not subjected to the determined phase shift at the time of the switch-over, in particular if it is below a predetermined limit value.

However, usually, at the time of the switching-over from the voltage-regulated operating mode to the current-regulated operating mode, the specified target coil current is subjected to this phase shift so that a phase jump in the actual coil current can be avoided. This phase shift is then also maintained during the duration of the current-regulated operating mode. Assuming that, when braking the motor or decreasing its speed, the switch-over to the voltage-regulated operating mode is to take place again at the same switch-over speed of the motor, and thus the prerequisites have not changed significantly, this phase shift can be canceled when switching back to the first operating mode.

Figure 5:
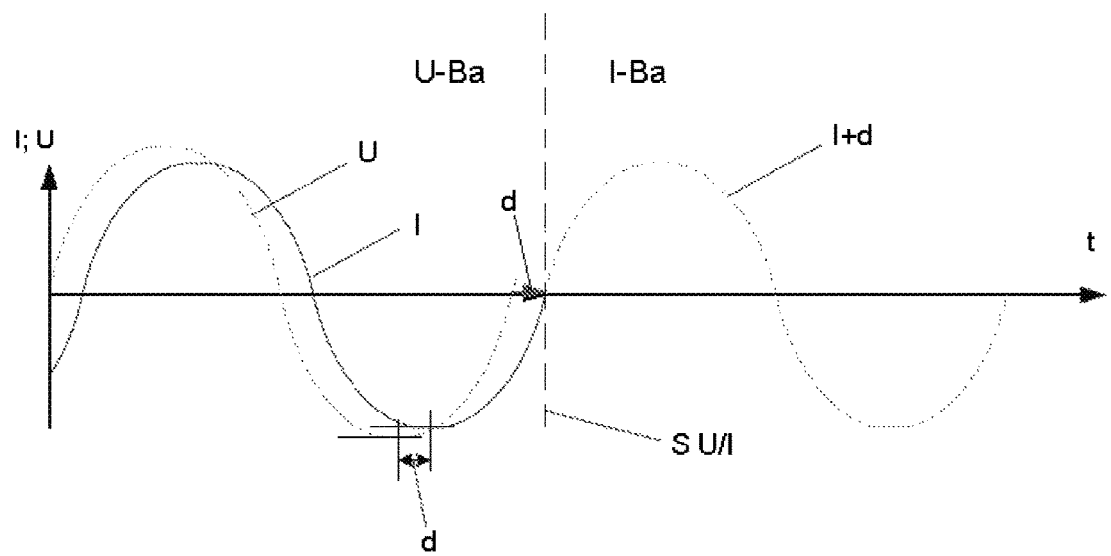
FIG. 5 a time-dependency diagram of voltages and currents in the area of transition of a voltage-regulated operating mode to a current-regulated operating mode.

This is shown graphically in FIG. 5. The left-hand part of the graph shows the course of the effective voltage U (corresponding to the target coil current course) applied to the relevant motor coil, the course of the actual coil current I generated, as well as the phase shift d between the two during the voltage-regulated operating mode U-Ba. The right-hand part of the graph shows the actual coil current waveform I+d, which is subjected by the phase shift d, during the current-regulated operating mode. Between the two operating modes the change-over time S U/I is indicated by a dashed line.

Figure 6:
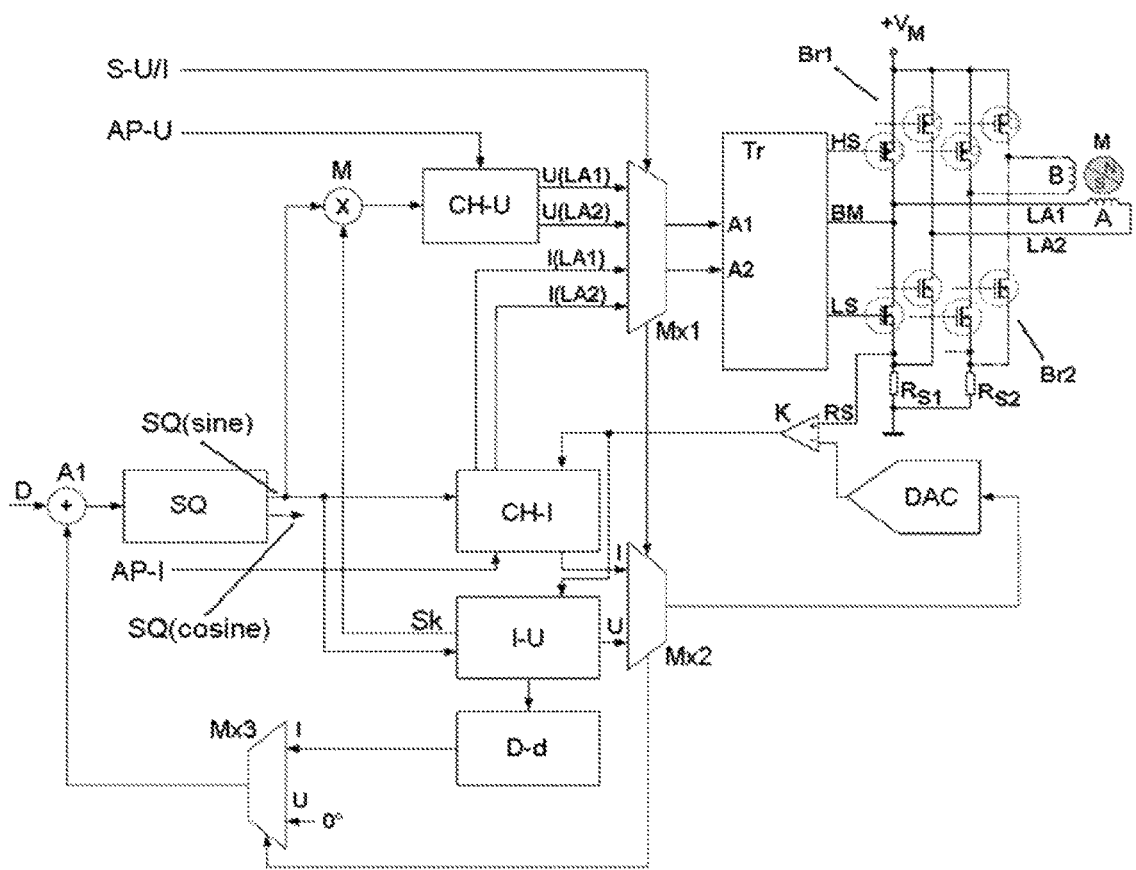
FIG. 6 a principle circuit diagram of an exemplary circuit assembly for conducting the methods according to the invention.

FIG. 6 shows a block diagram of an exemplary embodiment of a circuit assembly for conducting the methods according to the invention.

The circuit arrangement comprises, as components known per se, an integrated motor driver circuit Tr, with which via first outputs HS (high side), LS (low side) and BM (bridge center point) a first bridge circuit Br1 is controlled which is arranged between a supply voltage $+V_M$ and ground, in order to apply in the voltage-controlled or voltage-regulated (first) operating mode a first PWM voltage U(LA1) according to FIG. 2(A) in a first direction and a second PWM voltage U(LA2) according to FIG. 2(B) in the opposite second direction to a first coil A of the motor M, so that an effective PWM voltage according to FIG. 2(C) is produced.

Furthermore, the driver circuit Tr and the first bridge circuit Br1 serve to switch in the current-regulated (second) operating mode the chopper phases, as described above with reference to FIG. 1, in order to impress the currents I(LA1), I(LA2) with corresponding polarities into the first coil A.

The coil currents actually flowing through the first coil A in both operating modes are measured by the voltage drop across a first measuring resistor $R_{S1}$ at the base point of the bridge circuit.

The second coil B of the motor M (in this example a 2-phase motor) is connected to a second bridge circuit Br2 with a second measuring resistor $R_{S2}$, which is controlled in a corresponding manner as explained above via second outputs HS (high side), LS (low side) and BM (bridge center point) of the driver circuit Tr, which are not shown here.

The components of the circuit arrangement according to the invention explained below, with which the driver circuit Tr is controlled via its inputs A1, A2, are shown only for one of the two coils (namely the first coil A) of the stepper motor M. These components are thus once again to be implemented for the other motor coil B (and, if appropriate, for each additional motor coil in the case of a multi-phase stepper motor) and to be connected to corresponding inputs B1, B2 (not shown) of the driver circuit Tr.

The circuit arrangement thus comprises a first chopper CH-U for the voltage-controlled or the voltage-regulated (first) operating mode, at the two outputs of which the first PWM voltage U(LA1) shown in FIG. 2(A) and the second PWM voltage U(LA2) according to FIG. 2(B) is generated.

Furthermore, a second chopper CH-I is provided for the current-regulated (second) operating mode, at the two first outputs of which the switching signals of the chopper phases generated for the two polarities of the coil currents I(LA1), I(LA2) are generated.

These outputs of the two choppers CH-U, CH-I are connected to the inputs A1, A2 of the driver circuit Tr via a first multiplexer Mx1. The first multiplexer Mx1 is switched by means of a switching signal S-U/I for switching between the first and the second operating mode as a function of the speed or the rotational speed of the motor.

The voltage RS, being positive or negative corresponding to the polarity of the coil currents at the measuring resistor $R_{S1}$ is fed to a first input of a comparator K, to the second input of which the output of a digital-to-analog converter DAC is applied, with which, as explained in the following, the target coil current values, preferably generated in the digital plane, are converted into analog voltage values, in order to compare the actual coil current value with the target coil current value.

The output signal at the output of the comparator K is fed to a first input of a unit I-U for current-controlling the first chopper CH-U, as well as to a first input of the second chopper CH-I.

A specified target motor current D is applied to a first input of an adder A1 of the circuit arrangement. This target motor current is supplied via an output of the adder A1 to a sequencer SQ with a sine/cosine table, at whose first and second output the two phase-shifted target coil currents for the first and the second coil A, B are generated. As already mentioned, only the circuit components and the signal processing for the first coil A are described below.

The target coil current at the output of the sequencer SQ (specified current) is fed to a first input of a multiplier M, to a second input of the second chopper-CH-I, and to a second input of the first unit I-U.

The unit I-U generates, at its first output, which is connected to a second multiplexer Mx2, a comparison coil current value U for the first operating mode, which depends on the output signal of the comparator K applied to its first input as well as on the target coil current applied at its second input, wherein the comparison coil current value U is applied during the first operating mode to the input of the digital-to-analog converter DAC via the second multiplexer Mx2, which is switched by the same switching signal S-U/I as the first multiplexer Mx1.

The unit I-U furthermore generates at a second output, which is connected to a second input of the multiplier M, a signal Sk for scaling the target coil current applied to the first input of the multiplier M. The output of the multiplier M, at which the scaled specified current is thus generated, is connected to a first input of the first chopper CH-U.

A signal AP-U, which is supplied to the circuit arrangement, is provided at a second input of the first chopper CH-U for setting operating parameters of the first chopper CH-U.

The first chopper CH-U generates in dependence of the signals applied to its two inputs the first and the second PWM voltage U(LA1), U(LA2) according to FIGS. 2(A) and 2(B), respectively, which then is applied by means of the driver circuit Tr and the bridge circuit Br in opposite directions to the first coil A, in order to produce the effective PWM voltage of FIG. 2(C).

The second chopper CH-I comprises a third input for a signal AP-I, which is fed to the circuit arrangement, for setting operating parameters of the second chopper CH-I.

The second chopper CH-I generates at its second output, which is connected to the second multiplexer Mx2, in dependence of the output signal of the comparator K applied to its first input, the target coil current applied to its second input, and the signal AP-I applied to its third input, a target coil current value I for the second operating mode, which is applied during the second operating mode to the input of the digital-to-analog converter DAC via the second multiplexer Mx2.

The circuit arrangement finally comprises a detector D-d for detecting the phase shift d between the effective voltage applied to the coil and the actual coil current according to FIG. 5 during the first operating mode and (shortly) before switching-over to the second operating mode. The phase shift determined as described above is fed to a first input of a third multiplexer Mx3, to the second input of which a value representative of a phase shift of 0° is applied. The third multiplexer Mx3 is switched by the same switching signal S-U/I as the first and the second multiplexer Mx1, Mx2, so that, at the moment of switching to the second operating mode, the first input of the third multiplexer Mx3 is passed through at its output, which is connected to a second input of the adder A1. In this way, the supplied target motor current D is subjected to this phase shift. During the first operating mode, the second input of the third multiplexer Mx3 is connected through to the second input of the adder A1, so that the supplied target motor current D is not subjected to any phase shift (0°).

A particular advantage of the circuit arrangement is inter alia that the same circuit components which serve during the current-regulated (second) operating mode for detecting and evaluating the actual coil current (i.e. the digital-to-analog converter DAC, the comparator K and the measuring resistor $R_{S1}$), are also used for regulating the duty factor during the voltage-regulated (first) operating mode, so that a complex integration of additional analog components into an integrated circuit is not required.

Figure 7:
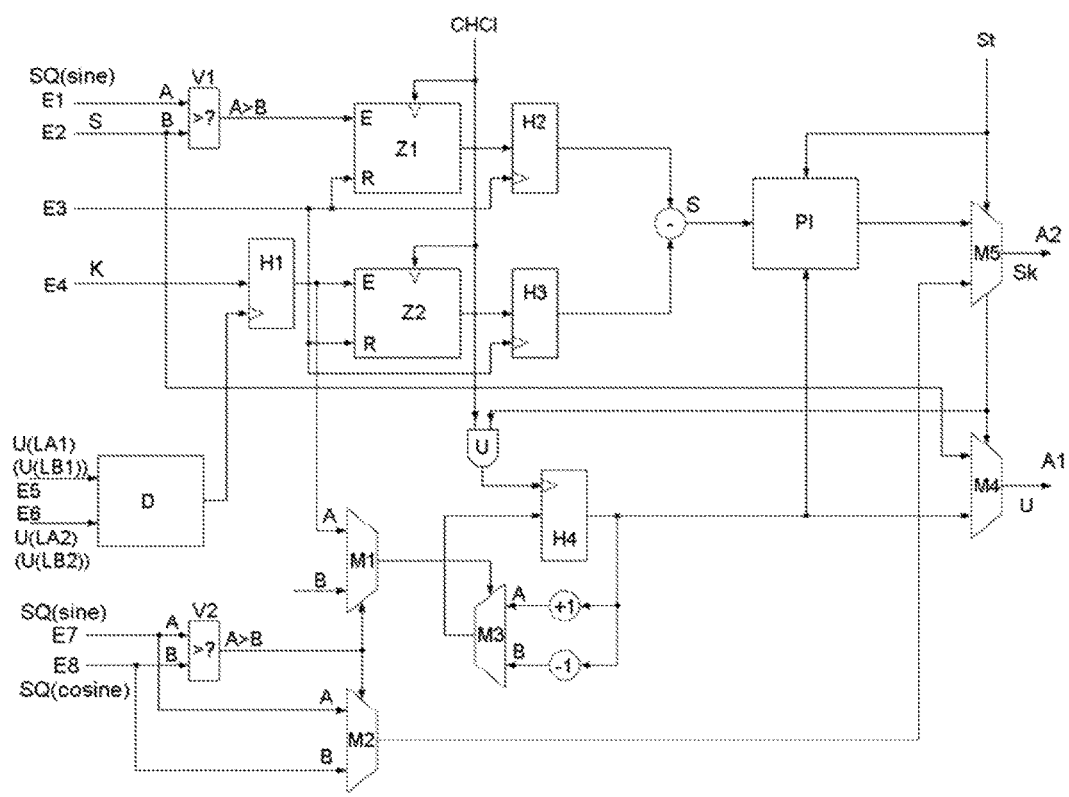
FIG. 7 a principle circuit diagram of a circuit component from FIG. 6.

FIG. 7 shows, by way of example, a schematic circuit diagram of the unit I-U for current tracking of the first chopper CH-U.

The unit I-U comprises a first counter Z1, a second counter Z2, a first comparator V1, a second comparator V2, a detector D, a first holding register H1, a second holding register H2, a third holding register H3, a fourth holding register H4, a first Multiplexer M1, a second multiplexer M2, a third multiplexer M3, a fourth multiplexer M4, a fifth multiplexer MS, a PI-regulator PI, a subtracter S, and a logical AND gate U.

The unit I-U comprises a total of eight inputs E1 to E8 and two outputs A1, A2. Inputs E2 and E3 are connected to components not illustrated in FIG. 6.

At the first input E1, which is connected to a first input A of the first comparator V1, the sinusoidal output of the sequencer SQ is applied.

Figure 4:
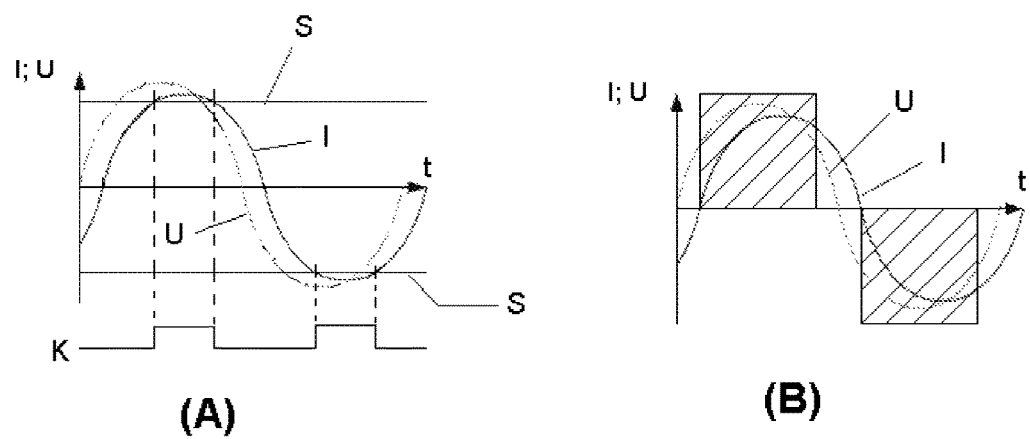
FIG. 4 time-dependency diagrams of the courses of voltages applied to a motor coil, and resulting currents and the detection thereof.

The value of the current threshold S explained with reference to FIG. 4 is applied to the second input E2, which is connected to a second input B of the first comparator V1.

A starting signal, which indicates the beginning of a current half-wave of the motor current, is applied to the third input E3, which is connected to a resetting input of the first and the second counter Z1, Z2 and a dock input of the second and the third holding registers H2, H3.

The output of the comparator K is applied to the fourth input E4, which is connected to an input of the first holding register H1.

The first and the second output signal U(LA1), U(LA2) of the first chopper CH-U are connected to the fifth and sixth input E5, E6, which are respectively connected to an input of the detector D (see FIGS. 2(A) and 2(B)).

The sine output of the sequencer SQ is applied to the seventh input E7, which is connected to a first input A of the second comparator V2, while at the eighth input E8, which is connected to a second input B of the second comparator V2, the cosine output of the sequencer SQ is applied.

Furthermore, a chopper clock signal CHCI is supplied to the unit I-U, which is fed to a clock input of the first and second counter Z1, Z2 as well as to a first input of the AND gate U. A switching signal St, which is supplied to the unit I-U and indicates a standstill of the motor, serves for switching the fourth and the fifth multiplexer M4, MS. It is also fed to a first input of the PI-regulator PI for charging its start values, as well as to the second input of the AND gate U.

The first output A1 of the unit I-U, which represents the output of the fourth multiplexer M4 and at which the target coil current value U for the first operating mode is generated, is connected to an input of the second multiplexer Mx2 of the circuit arrangement and is switched through this in the first operating mode to the digital-to-analog converter DAC.

The second output A2 of the unit I-U, which represents the output of the fifth multiplexer MS and at which the signal Sk is generated for scaling the target coil current applied to the first input of the multiplier M, is connected to the second input of the multiplier M.

The unit I-U shown in FIG. 7 serves, during the voltage-regulated (first) operating mode, on the one hand, when the motor is in standstill, to select the coil which is more or most energized in comparison to the other coil or coils and to control this coil as described above, and on the other hand, during the rotation of the motor, to count during each half wave of the coil currents the chopper phases in which, on the one hand, the specified target coil current value and, on the other hand, the actual coil current value reaches and exceeds the fixed current threshold S, as described in connection with FIG. 4, in order to regulate the PI-regulator in dependence on the difference between these counts for the purpose of scaling the duty factor of the effective PWM voltage applied to the coils.

In detail, the more energized coil is determined at standstill of the motor by means of the second comparator V2. The corresponding selection signal at the output of the second comparator V2 switches the specified target current course of the coil being more energized by means of the second multiplexer M2 and the fifth multiplexer MS to the multiplier M (FIG. 6) for scaling the sine- or cosine-current values from the sequencer SQ for the first chopper CH-U.

In addition, the selection signal switches the first multiplexer M1 at whose inputs, respectively, the output signal of the comparator K, each stored in the first holding register H1 is applied, the output signal being the result of the comparison between the actual coil currents in the two motor coils A, B on the one hand and the respective target coil currents on the other hand.

The output signal of the first multiplexer M1, in turn, switches the third multiplexer M3, so that the output signal of the fourth holding register H4 (which is supplied via the fourth multiplexer M4 to the digital-to-analog converter DAC as a target-value signal during the standstill of the motor) is increased or decreased by a value of 1. Thus, as explained above, the actual coil current, obtained by corresponding adjustment of the effective duty factor, oscillates around the related target coil current. This is achieved according to the resolution of the PWM voltage on average.

The chopper clock signal CHCI is thereby fed to the clock input of the fourth holding register H4 via the AND gate U only when the switching signal St indicating the standstill of the motor has the value 1.

When the motor rotates, the switching signal St switches the fourth and the fifth multiplexers M4, MS so that, on the one hand, the current threshold S applied to the second input E2 of the unit I-U is supplied to the digital-to-analog converter DAC via the fourth multiplexer M4, and, on the other hand, the output of the PI-regulator PI is fed via the fifth multiplexer MS to the multiplier M for scaling the voltage supply.

The instantaneous value of the specified target coil current is compared with the current threshold S by means of the first comparator V1. If this value is greater than the current threshold S, the count of the first counter Z1 is increased by the value 1 by means of the output signal of the first comparator V1 when a chopper clock signal CHCI occurs.

Furthermore, the output signal of the comparator K supplied to the fourth input E4 of the unit I-U is stored in the first holding register H1. With the preferred clocking of the first holding register H1 by means of a clock signal generated by the detector D, it is counted by applying the content of the first holding register H1 at the input of the second counter Z2 and upon the occurrence of the chopper clock signal CHCI, how often within one half wave the actual coil current reaches and exceeds the current threshold S. The clock signal generated by the detector D determines the point in time at which the output signal of the comparator K is temporarily stored and thus detected by the second counter Z2. The clock signal is generated in dependence on the first and second output signal U(LA1), U(LA2) of the first chopper CH-U (see FIGS. 2(A) and 2(B)) applied to the detector D, and considering the blank time, so that it is essentially at the temporal center of each chopper phase according to FIG. 2(C).

The count of the first counter Z1 is supplied to the second holding register H2, and the count of the second counter Z2 is supplied to the third holding register H3. As soon as the starting signal, indicating the beginning of a (new) half-wave of the coil current, occurs at the third input E3 of the unit I-U, the count of the first and second counter Z1, Z2 is reset to 0 and the contents of the second and third holding registers H2, H3 is read-out and subtracted from each other by means of the subtracter S. The difference between the two, which according to the above description in connection with FIG. 4(A) is a measure of the extent to which the actual coil current (which is phase-shifted in relation to the applied voltage) deviates from the target coil current, is supplied as a regulation deviation to the input of the PI-regulator PI.

As a starting value at the start of the rotation of the motor, the last current value determined during the standstill of the motor is fed to the PI-regulator PI from the fourth holding register H4, in order to ensure a jump-free transition. Further starting values are also loaded into the PI-regulator PI when the switching signal St indicating the standstill of the motor has a low level. Finally, the output of the PI-regulator PI is fed via the fifth multiplexer MS to the multiplier M for scaling the specified voltage.

The invention claimed is:

1. Method for operating a stepper motor with a specified target coil current course which is composed of a plurality of temporally successive instantaneous target coil current values which are generated by chopper phases in the stepper motor coils, comprising
   operating the stepper motor according to a first operating mode in which in each chopper phase a voltage is applied to at least one of the stepper motor coils, the amplitude and polarity of the applied voltage being adjusted to generate the instantaneous target coil current value, and
   operating the stepper motor according to a second operating mode in which in each chopper phase a current is impressed into the stepper motor coils, the value and polarity of the applied current being adjusted to generate the instantaneous target coil current value,
   wherein the first operating mode is activated in a predetermined low rotational speed range of the steeper motor and the second operating mode is activated in a predetermined higher rotational speed range of the steeper motor that is higher than the predetermined low rotational speed range, and wherein, for regulating the actual coil current during rotation of the stepper motor in the first operating mode, a current threshold (S) is fixed during each half-wave of the specified target coil current such that it is to be reached and exceeded only during a specified part of the duration of the half-wave, wherein in each half-wave the number of those chopper phases in which the specified target coil current reaches and exceeds the current threshold (S) is compared to the number of those chopper phases in which the actual coil current actually reaches and exceeds the current threshold (S), and wherein the difference between these numbers is fed as a regulation deviation to a regulator for regulating the actual coil current in the following half-wave.

2. A method according to claim 1, in which during the first operating mode, a PWM voltage is applied to each of the stepper motor coils, whose duty factor is controlled or regulated to adjust the amplitude of the voltage across the respective coil.

3. A method according to claim 2, in which during the first operating mode and at standstill of the steeper motor, the duty factor is controlled only at that respective stepper motor coil of the steeper motor at which the higher or highest coil current is measured in comparison to actual coil currents measured at other steeper motor coils.

4. A method according to claim 3, in which during the first operating mode and at standstill of the motor, the voltage applied to the related stepper motor coil is regulated with each chopper phase by increasing or reducing the duty factor of the PWM voltage applied to the stepper motor coil by a specified amount.

5. A method according to claim 1, in which during the first operating mode, a first PWM voltage having a first polarity and a second PWM voltage having a second polarity opposite thereto are applied to at least one of the stepper motor coils, the duty factors thereof being adjustable for adjusting the amplitude and the polarity of the voltage applied to the at least one stepper motor coil.

6. A method according to claim 1, in which during the first operating mode, the current actually flowing through at least one of the stepper motor coils is measured and the amplitude of the voltage applied to a related stepper motor coil is correspondingly regulated.

7. A method according to claim 1, in which during the first operating mode at a rotation of the motor, the amplitude of the voltage is regulated by a PI-regulator.

8. A method according to claim 1, wherein, at a time of switching-over from the first to the second operating mode, the specified target coil current is subjected to a phase shift with which the actual coil current was shifted against the voltage applied to the related steeper motor coil during the first operating mode before the switching-over.

9. A method according to claim 8, in which, upon switching from the second to the first operating mode, the subjection of the specified target coil current with the phase shift at the time of switching-over from the first to the second operating mode is canceled.

10. A method according to claim 8, in which the phase shift is determined in the first operating mode based on a time delay between a peak value of the voltage applied to one of the stepper motor coils and the peak value of the coil current generated thereby and actually flowing through the stepper motor coil.

11. A method according to claim 8, in which the phase shift in the first operating mode is determined based on a time delay of a center point between a beginning and an end of reaching and exceeding of the current threshold (S) by the specified target coil current, against the center point between the beginning and the end of reaching and exceeding of the current threshold (S) by the actual coil current.

12. A method according to claim 1, in which the current threshold (S) is set to such a level that it is reached and exceeded by the specified target coil current only for a duration of between approximately 5% and approximately 20% of the duration of the half-wave.

13. A method according to claim 1, in which during the second operating mode the current is impressed into each steeper motor coil by activation of one of the three chopper phases ON, fast decay (FD), or slow decay (SD).

14. A method according to claim 1, in which the stepper motor is controlled in micro-step mode of operation or in half or full step mode of operation each with a sinusoidal or non-sinusoidal target coil current course.

15. Circuit arrangement for operating a stepper motor with a specified target coil current course which is composed of a plurality of temporally successive instantaneous target coil current values which are generated by chopper phases in the stepper motor coils, comprising:

a first chopper (CH-U) for a first operating mode activated in a predetermined low rotational speed range of the motor, by which a PWM voltage with adjustable duty factor and adjustable polarity is applied to at least one of the stepper motor coils (A; B) of the stepper motor, for generating the instantaneous target coil current value, a second chopper (CH-I) for a second operating mode activated in a predetermined higher rotational speed range of the stepper motor that is higher than the predetermined low rotational speed range, by which by activation of at least one of three chopper phases ON, fast decay (FD), or slow decay (SD) for generating the instantaneous target coil current value, a current is impressed into the stepper motor coils, and a comparator (K) for comparing an actual coil current actually flowing through at least one of the stepper motor coils (A; B), with the specified target coil current, wherein an output signal of the comparator (K) is supplied to a unit (I-U) for current tracking of the first chopper (CH-U) by scaling of the specified target coil current during the first operating mode, and is supplied to the second chopper (CH-I) for activating at least one of the three chopper phases during the second operating mode, wherein the unit (I-U) for current tracking of the first chopper (CH-U) comprises a first counter (Z1) with which during each half-wave of the specified target coil current the number of those chopper phases is counted, in which the specified target coil current reaches and exceeds a fixed current threshold (S), a second counter (Z2) with which during each half-wave of the specified target coil current the number of those chopper phases is counted, in which the actual coil current reaches and exceeds the current threshold (S), a subtractor (S) with which the difference between these two counts is determined, and a regulator (PI) to which the output of the subtractor (S) is fed, for regulating the actual coil current by scaling the specified target coil current.

16. Circuit arrangement according to claim 15, wherein the regulator is a PI-regulator.

17. Circuit arrangement according to claim 15, comprising a detector (Dd) for detecting a phase shift (d) between an effective voltage applied to one of the steeper motor coils (A; B) and the actual stepper motor coil current during the first operating mode, and an adder (A1) with which the specified target coil current (D) is subjected with the phase shift (d) upon switching into the second operating mode and during the second operating mode.

* * * * *